Nov. 30, 1937.  R. M. J. TRAYNOR  2,100,675
FRUIT AND VEGETABLE WASHER
Original Filed June 25, 1935  2 Sheets-Sheet 1
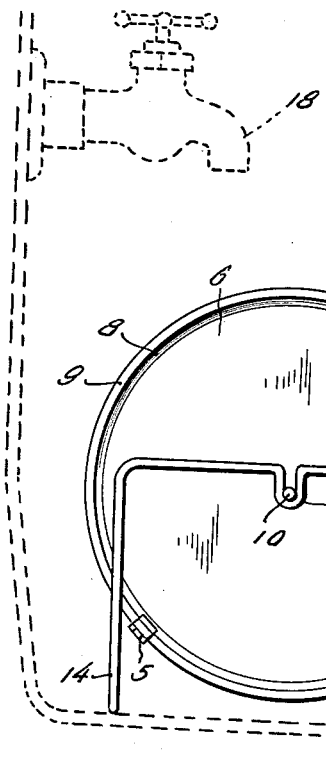
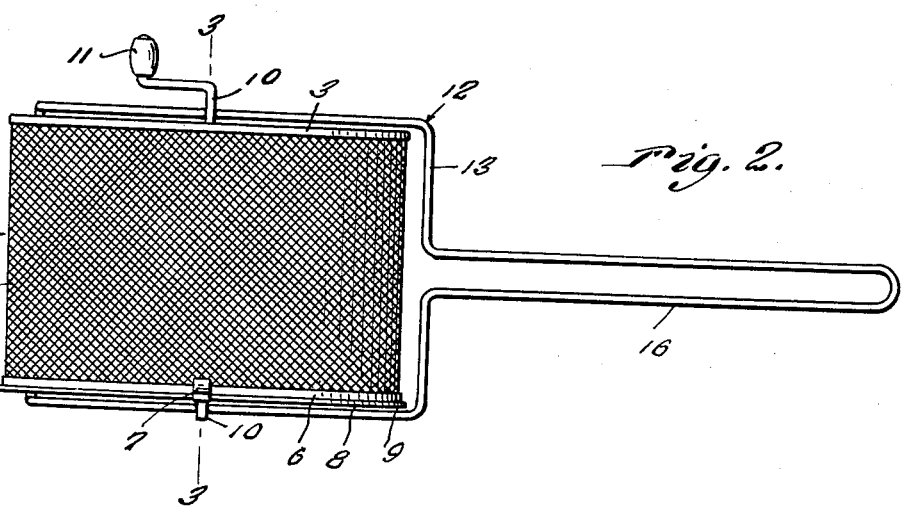
Inventor
Robert M. J. Traynor
By Clarence A. O'Brien
Attorney Nov. 30, 1937.　　　R. M. J. TRAYNOR　　　2,100,675
FRUIT AND VEGETABLE WASHER
Original Filed June 25, 1935　　2 Sheets—Sheet 2

Inventor
Robert M. J. Traynor
By Clarence A. O'Brien
Attorney

Patented Nov. 30, 1937

2,100,675

UNITED STATES PATENT OFFICE 2,100,675

FRUIT AND VEGETABLE WASHER

Robert M. J. Traynor, Summit, N. J.

Application June 25, 1935, Serial No. 28,343
Renewed June 9, 1937

2 Claims. (Cl. 146—200)

The present invention relates to new and useful improvements in washers for fruits and vegetables, particularly spinach and lettuce, and has for its primary object to provide a device of this character embodying a novel construction, combination and arrangement of parts through the medium of which foods of the aforementioned character may be thoroughly cleaned with a minimum of labor and in a comparatively short time.

Another very important object of the invention is to provide a fruit and vegetable washer of the type including a rotary foraminous container, together with novel means for supporting said container in a conventional sink or the like beneath a spigot or other source of water.

Still another very important object of the invention is to provide a fruit and vegetable washer of the character set forth embodying a construction which is such that substantially all of the water may be expelled therefrom by centrifugal force after the washing operation.

Still another important object of the invention is to provide a washer of the rotary container type wherein the aforementioned supporting structure may be utilized as a friction brake to arrest rotation of the container when the operation has been completed.

Other objects of the invention are to provide a fruit and vegetable washer which will be comparatively simple in construction, strong, durable, highly efficient and reliable in use, compact, light in weight, portable, attractive in appearance and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:—

Figure 1 is a view in side elevation of a fruit and vegetable washer constructed in accordance with the present invention, showing the same mounted in a sink.

Figure 2 is a view in top plan of the invention.

Figure 3:
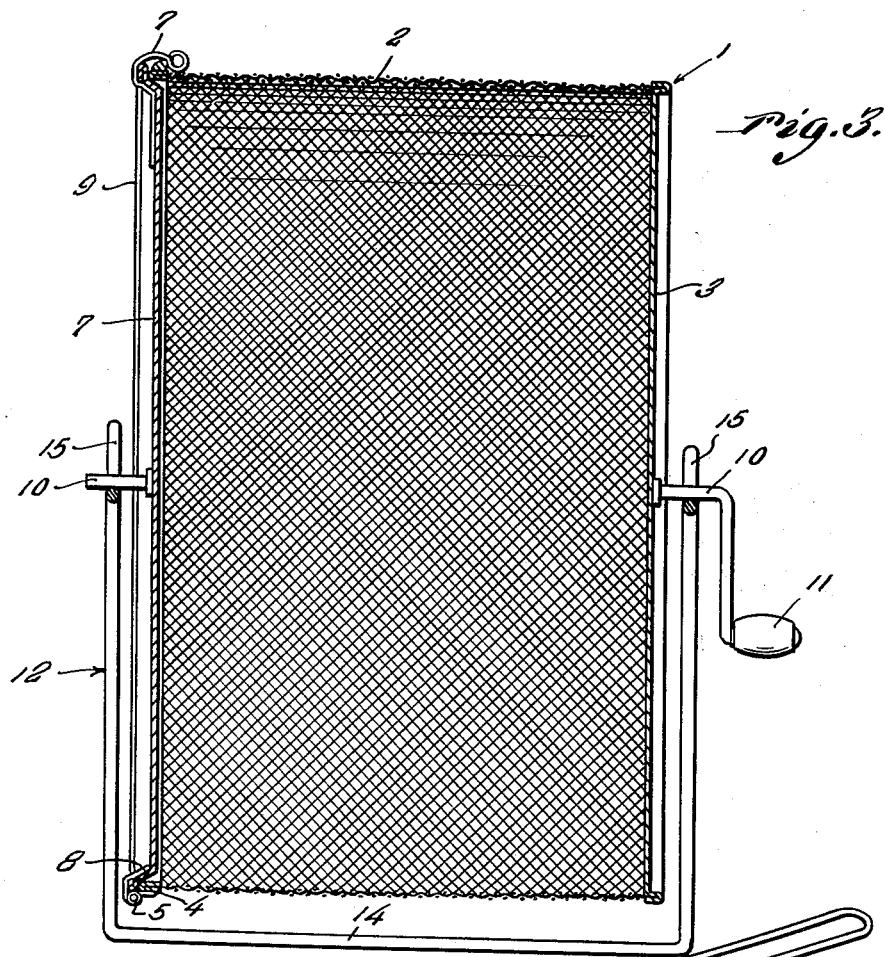
Figure 3 is a vertical sectional view, taken substantially on the line 3—3 of Figure 2.

Referring now to the drawings in detail, it will be seen that the embodiment of the invention which has been illustrated comprises a rotary container for the reception of the fruit or vegetables, said container being designated generally by the reference numeral 1. The container 1 is adapted to rotate in a vertical plane and said container includes a cylindrical screen 2 provided with an end wall 3. At its other end, the container 1 is open and provided with a binding 4.

Hingedly mounted, as at 5, on the open end of the screen cylinder 2 is a closure 6 which is releasably secured in closed position through the medium of a suitable latch 7. The closure 6 includes a conical portion 8 which is engageable in the open end portion of the screen cylinder 2 and a marginal rim 9 which is adapted to seat on the open end of said cylinder 2. It will thus be seen that the open end of the cylinder 2 will be strengthened or reinforced by the closure 6. Trunnions 10 project from the end wall 3 and closure 6 of the container 1, one of said trunnions being provided with an operating crank 11, as illustrated to advantage in Figure 3 of the drawings.

Figure 4:
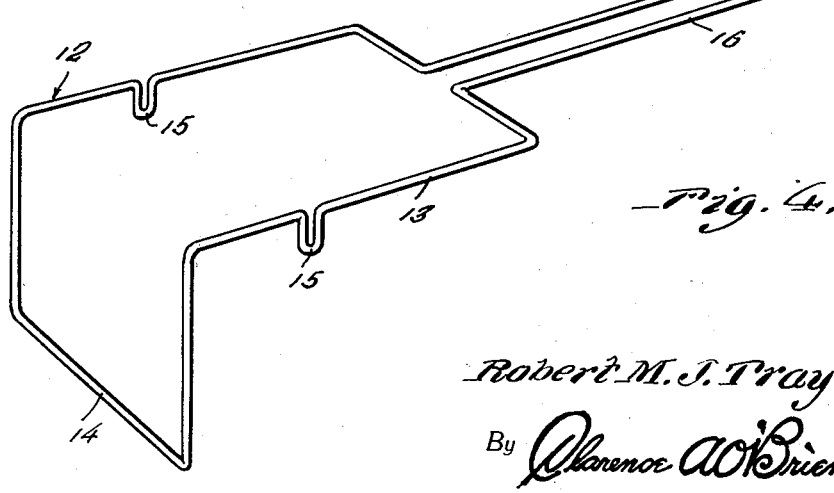
Figure 4 is a perspective view of the supporting stand for the rotary container.

The container 1 is adapted to be rotatably and removably mounted on a supporting stand which is designated generally by the reference numeral 12. As best seen in Figure 4 of the drawings, the stand 12 includes a frame 13 for the reception of the container 1, one end portion of said frame being turned downwardly at right angles in a manner to provide a support 14. At an intermediate point, the frame 14 has formed therein depending loops providing bearings 15 for the reception of the trunnions 10. At its other end, the frame 13 is formed to provide an elongated, substantially U-shaped handle 16.

In use, the assembled device is adapted to be mounted in a sink 17 with the rotary container 1 disposed beneath a spigot or faucet 18. When so mounted, the portion 14 of the stand 12 rests on the bottom of the sink 17 and the handle 16 rests on the usual rim or flange of said sink (see Figure 1). Of course, before the device is mounted in the sink the product to be washed is placed in the container 1 while said container is removed from the stand 12 by opening the closure 6. With the spigot 18 opened to the desired position to discharge the required stream of water into the foraminous cylinder 2, the container 1 is rotated through the medium of the handle 11. In this manner the product in the container 1 will be expeditiously but thoroughly washed. Then, by closing the spigot 18 and rotating the container 1 again, excess water will be expelled by centrifugal force. By pressing the two legs of the substantially U-shaped handle 16 toward each other, the sides of the frame 13 may be frictionally engaged with the ends of the rotary container 1, thus facilitating stopping of said container when desired. It may be well to here state that the stand 12 is formed from a single length of suitable resilient wire.

It is believed that the many advantages of a fruit and vegetable washer constructed in accordance with the present invention will be readily understood, and although a preferred embodiment of the device is as illustrated and described, it is to be understood that changes in the details of construction and in the combination and arrangement of parts may be resorted to which will fall within the scope of the invention as claimed.

What is claimed is:—

1. A washer of the class described comprising a stand, and a foraminous container rotatably mounted on the stand, said stand being formed from a single length of resilient wire and including a frame for the reception of the container, said frame comprising a downturned end portion constituting a support, and a substantially U-shaped handle projecting longitudinally from the other end of the frame, the container being substantially cylindrical and including trunnions on its ends, an actuating handle on one of said trunnions, the frame further including depending loops for the reception of the trunnions and constituting bearings therefor.

2. A washer of the class described comprising a stand, and a foraminous container rotatably mounted on the stand, said stand being formed with a frame for the reception of the container, said frame consisting of a down turned U-shaped end portion constituting a support, and a substantially U-shaped handle projecting longitudinally from the other end of the frame, the container including trunnions on its ends, an actuating handle on one of said trunnions, the frame further including depending loops for the reception of the trunnions and constituting bearings therefor.

ROBERT M. J. TRAYNOR.